United States Patent
Hanaoka et al.

(10) Patent No.: US 8,360,735 B2
(45) Date of Patent: Jan. 29, 2013

(54) SERIAL AXIAL FAN

(75) Inventors: Satoru Hanaoka, Kyoto (JP); Hidenobu Takeshita, Kyoto (JP); Hiroyoshi Teshima, Kyoto (JP)

(73) Assignee: Nidec Corporation, Kyoto (JP)

( * ) Notice: Subject to any disclaimer, the term of this patent is extended or adjusted under 35 U.S.C. 154(b) by 343 days.

(21) Appl. No.: 12/611,160

(22) Filed: Nov. 3, 2009

(65) Prior Publication Data

US 2010/0119385 A1    May 13, 2010

(30) Foreign Application Priority Data

Nov. 11, 2008  (JP) ................................. 2008-288687
Oct. 1, 2009   (JP) ................................. 2009-229342

(51) Int. Cl.
*F04B 49/00* (2006.01)

(52) U.S. Cl. ......... 417/2; 417/423.5; 417/367; 417/371; 415/61; 415/68; 310/112; 310/68 B; 310/67 R

(58) Field of Classification Search .............. 415/61, 415/66, 68, 69; 416/124, 125, 126, 130; 417/2, 44.2, 423.5, 366–371; 310/112, 68 B, 310/67 R
See application file for complete search history.

(56) References Cited

U.S. PATENT DOCUMENTS

| | | | | |
|---|---|---|---|---|
| 5,925,948 A * | 7/1999 | Matsumoto | ................ | 310/67 R |
| 6,257,832 B1 * | 7/2001 | Lyszkowski et al. | ............. | 417/2 |
| 6,445,148 B2 * | 9/2002 | Huang et al. | ..................... | 318/34 |
| 6,840,743 B2 * | 1/2005 | Herke et al. | ....................... | 417/2 |
| 6,986,260 B2 * | 1/2006 | Oda et al. | ........................ | 62/179 |
| 7,156,611 B2 * | 1/2007 | Oosawa et al. | ................. | 415/68 |
| 8,025,490 B2 * | 9/2011 | Lee et al. | .................... | 417/423.5 |
| 8,183,729 B2 * | 5/2012 | Takeuchi | ....................... | 310/114 |
| 2001/0015629 A1 | 8/2001 | Huang et al. | | |
| 2005/0184605 A1 * | 8/2005 | Vinson et al. | ............... | 310/68 R |
| 2006/0120903 A1 * | 6/2006 | Iwasaki et al. | ............. | 417/423.1 |
| 2007/0274821 A1 * | 11/2007 | Yoshida | .......................... | 415/68 |
| 2008/0053639 A1 * | 3/2008 | Lin et al. | ....................... | 165/80.3 |
| 2008/0124232 A1 * | 5/2008 | Lee et al. | .................... | 417/423.5 |
| 2008/0138199 A1 | 6/2008 | Chang et al. | | |

FOREIGN PATENT DOCUMENTS

| | | | |
|---|---|---|---|
| JP | 62-048290 A | | 3/1987 |
| JP | 06-284775 A | | 10/1994 |
| JP | 07-118935 B2 | | 12/1995 |
| JP | 11-346498 A | | 12/1999 |
| JP | 2002-349476 A | | 12/2002 |
| JP | 2007-046511 A | | 2/2007 |
| JP | 2008-106739 | * | 5/2008 |
| JP | 2008-106739 A | | 5/2008 |

* cited by examiner

*Primary Examiner* — Devon Kramer
*Assistant Examiner* — Joseph Herrmann
(74) *Attorney, Agent, or Firm* — Keating & Bennett, LLP

(57) ABSTRACT

A serial axial fan preferably includes a first impeller and a second impeller each having a plurality of blades radially extending with a predetermined rotation axis as the center, a first motor portion, a second motor portion, a first housing, and a second housing. The first motor portion has a first circuit board on which at least one electronic component arranged to control the driving of the first impeller is mounted. The second motor portion has a second circuit board on which at least one electronic component arranged to control the driving of the second impeller is mounted. The first and second circuit boards are electrically connected. The driving of the first impeller and the driving of the second impeller are controlled by the electronic component disposed on at least one of the first and second circuit boards.

8 Claims, 6 Drawing Sheets

SERIAL AXIAL FAN

BACKGROUND OF THE INVENTION

1. Field of the Invention

The present invention relates to a fan. More specifically, the present invention relates to a serial axial fan.

2. Description of the Related Art

Recently, the size and the thickness of electronic devices including personal computers are being progressively reduced. In conjunction with this progress, electronic components are mounted in a high-density on the inside of the electronic device, so that it is difficult for the heat generated in the electronic device to be released. A fan is typically used to release heat. Various kinds of fans such as axial fans and centrifugal fans are provided for the intended use. Among them, in an electronic device such as a server, a serial axial fan in which two or more axial fans are connected in series is often used.

In such a serial axial fan, in addition to the cooling performances including a large volume of air and a high static pressure, other performances such as low power and low noise are also required. In order to realize such performances, in each of the axial fans connected in series, the rotation of each impeller is required to be efficiently controlled. In controlling such fans, it is necessary to use a complicated circuit in which various electronic components are combined. Especially in the serial axial fan, it is necessary to independently control two or more axial fans. Accordingly, the rotation of each impeller is controlled by a circuit board disposed in a corresponding one of axial fans.

In some serial axial fans, respective axial fans are not required to have the same uniform performances, but are instead required to have different performances. In such a case, electronic components used in the respective circuit boards are sometimes different. In some cases, an electronic component which can be shared by the circuit boards is provided in each of the circuit boards individually, so that the cost is disadvantageously increased.

As for the serial axial fan, in order to enhance the noise characteristic and the characteristic of volume of air, an optimal rotational speed is set in each of axial fans. Each of the axial fans may, however, sometimes operate at a rotational speed which is different from the set rotational speed by the influence of the variety of components. In addition, because of the influence of the changes in operating environments, such as system impedances of the serial axial fan, the serial axial fan may operate at a rotational speed which is different from the set rotational speed.

SUMMARY OF THE INVENTION

A serial axial fan according to one preferred embodiment of the present invention preferably includes: a first impeller having a plurality of first blades radially extending from a predetermined rotation axis as a center; a first motor portion arranged to drive and rotate the first impeller so as to generate an air flow in an axial direction of the rotation axis; a first housing arranged to accommodate the first impeller and the first motor portion, the first housing being defined by a cylinder having openings in both end portions in the axial direction; a second impeller having a plurality of second blades radially extending with the rotation axis as the center; a second motor portion arranged to drive and rotate the second impeller so as to generate an air flow in the axial direction of the rotation axis; and a second housing, aligned with the first housing in the axial direction, arranged to accommodate the second impeller and the second motor portion, the second housing being defined by a cylinder having openings in both end portions in the axial direction; wherein the first motor portion includes a first circuit board on which at least one electronic component arranged to control the driving of the first impeller is mounted, the second motor portion includes a second circuit board on which at least one electronic component arranged to control the driving of the second impeller is mounted, the first circuit board and the second circuit board are electrically connected, and the driving of the first impeller and the driving of the second impeller are controlled by the electronic component mounted on at least one of the first and second circuit boards.

According to the above-described serial axial fan, the design of circuit board can be flexibly performed in view of the desired performances of a plurality of axial fans and the like.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
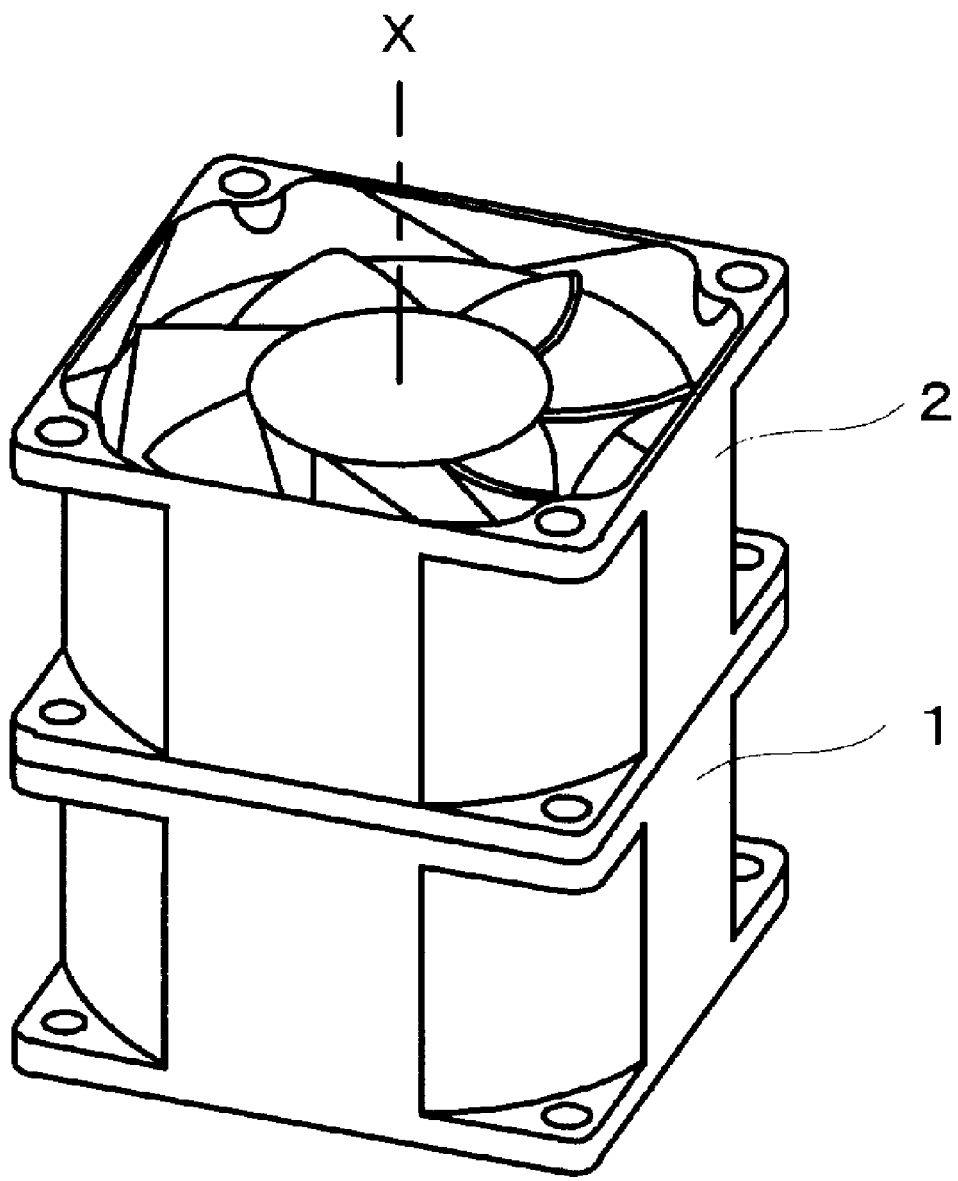
FIG. 1 is a perspective view of a serial axial fan according to a first preferred embodiment of the present invention.

Referring to FIGS. 1 through 6, preferred embodiments of the present invention will be described in detail. It should be noted that in the explanation of preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel or substantially parallel to a rotation axis, and a radial direction indicates a direction perpendicular or substantially perpendicular to the rotation axis.

First Preferred Embodiment

Figure 2:
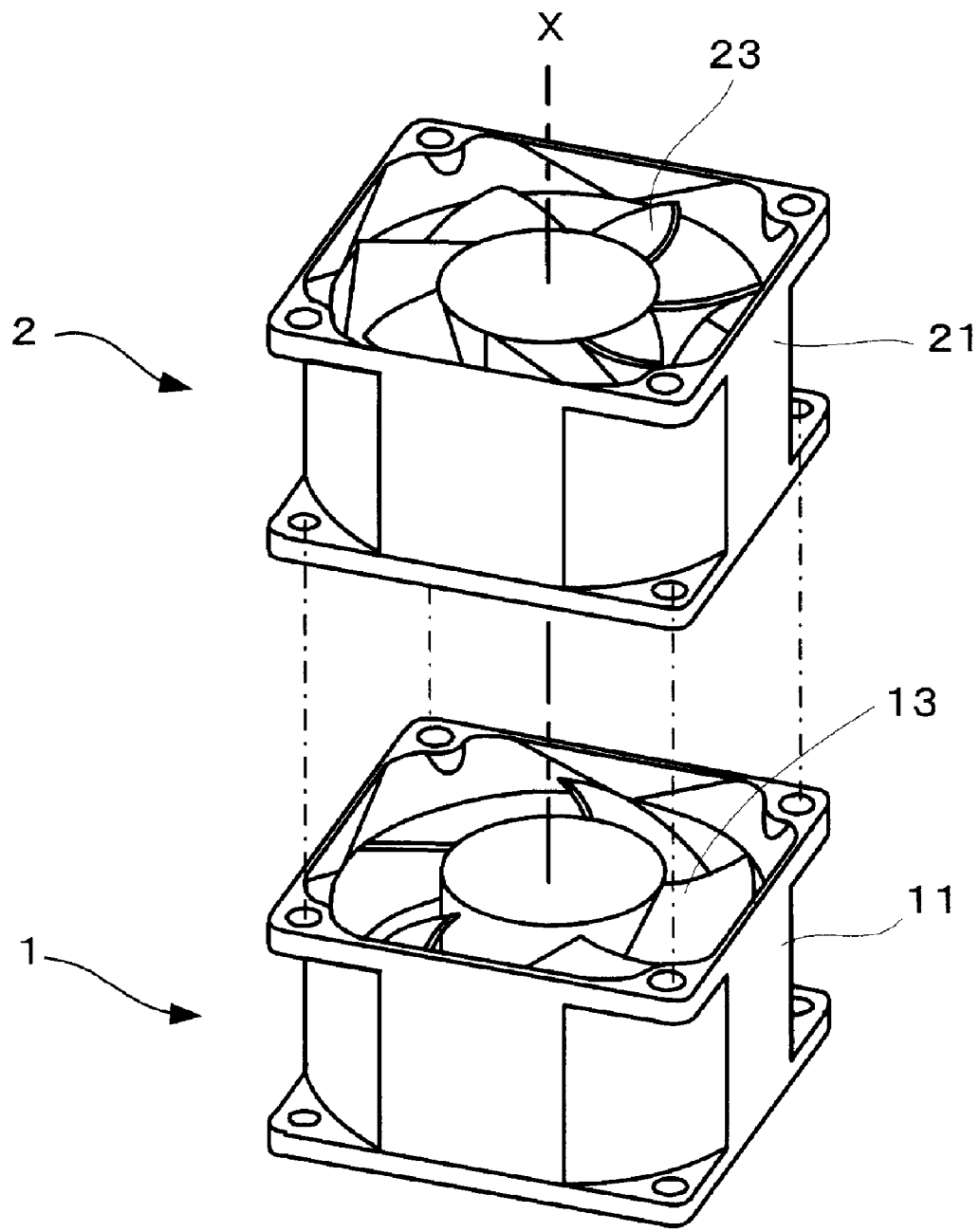
FIG. 2 is an exploded perspective view of the serial axial fan of FIG. 1.

Hereinafter, a first preferred embodiment of the serial axial fan of the present invention will be described. FIG. 1 is a perspective view illustrating the serial axial fan according to the first preferred embodiment. FIG. 2 is an exploded perspective view of the serial axial fan of FIG. 1.

The serial axial fan according to the first preferred embodiment is used, for example, as a cooling fan arranged to air-cool an electronic device such as a server. As shown in FIG. 1, the serial axial fan preferably includes two axial fans 1 and 2 connected in series. The serial axial fan is defined by the first axial fan 1 disposed on the lower side of FIG. 1, and the second axial fan 2 disposed on the upper side thereof. The respective axial fans 1 and 2 are coupled in such a manner that a shaft 1423 and a shaft 2423 of the respective fans 1 and 2 are aligned along a single rotation axis X (FIG. 3).

Figure 3:
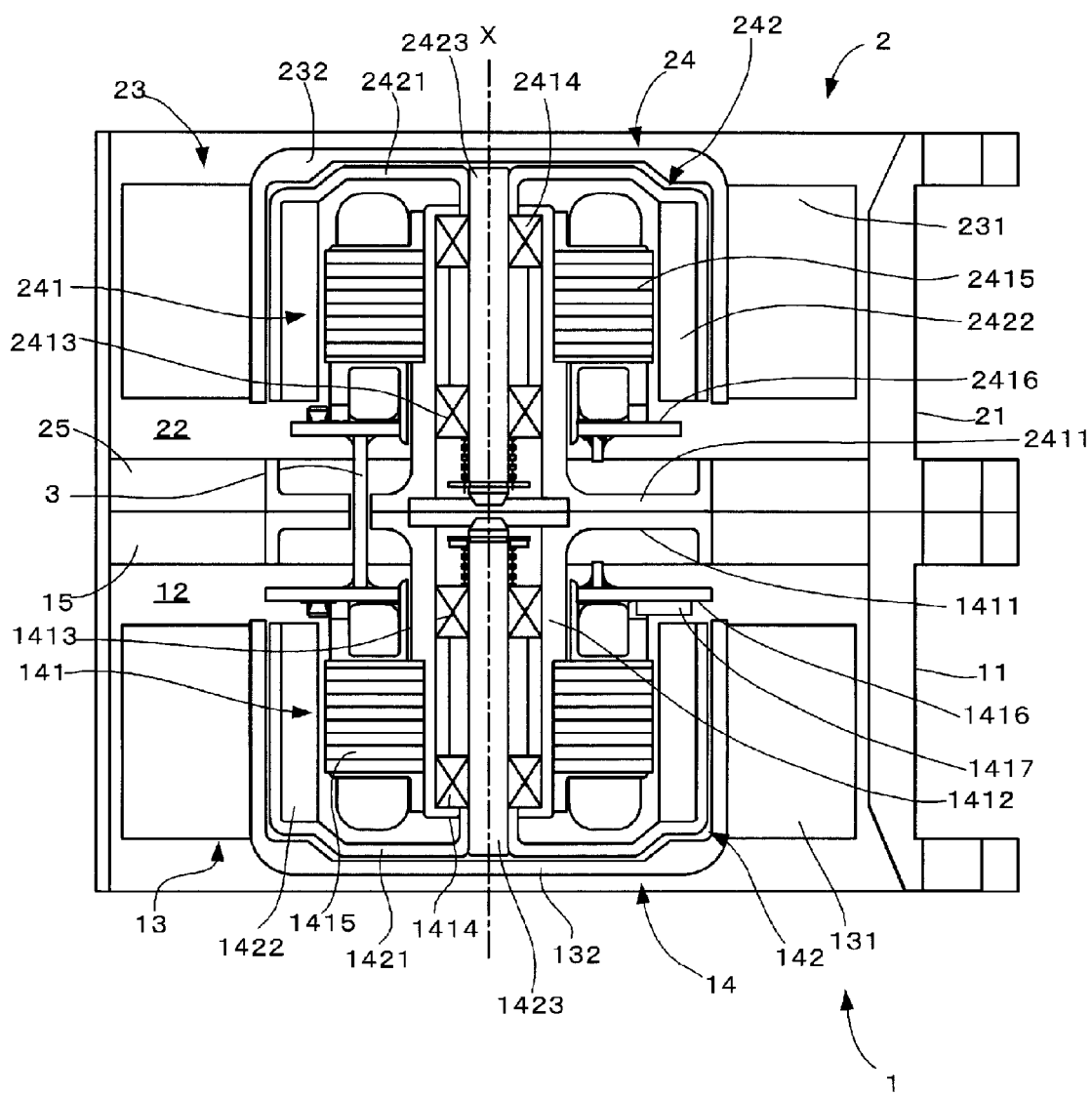
FIG. 3 is a longitudinal sectional view of the serial axial fan of FIG. 1.

FIG. 3 is a longitudinal sectional view of the serial axial fan taken along a plane including the rotation axis X. First, the first axial fan 1 will be described.

As shown in FIG. 3, the first axial fan 1 preferably includes a substantially square-shaped tubular first housing 11. In the housing 11, a substantially cylindrical air channel 12 of which the upper and lower ends in FIG. 3 are opened is defined. Through the housing 11, the air flows upward and downward. On the inside of the air channel 12 of the first housing 11, a first impeller 13 arranged to create the flow of air is disposed. The first impeller 13 preferably includes a plurality of first blades 131 disposed with equal pitches and radially extending with the rotation axis X as the center. The first impeller 13 is driven and rotated by a first motor portion 14 disposed in the center of the first housing 11. By the rotation of the first impeller 13, the flow of air from the upper side to the lower side of FIG. 3 is generated in the direction along the rotation axis X. In the first housing 11, in an upper end portion opposite to the second axial fan 2, a plurality of first supporting ribs 15 arranged to support the first motor portion 14 are disposed. The first supporting ribs 15 are preferably arranged so as to radially extend with the rotation axis X as the center. One end of each of the first supporting ribs 15 is connected to an inner wall of the first housing 11, and the other end thereof is connected to a first base portion 1411.

As shown in FIG. 3, the first motor portion 14 preferably includes a first stator portion 141 which is a fixed assembly, and a first rotor portion 142 which is a rotating assembly. The first rotor portion 142 is preferably supported via a bearing mechanism with the rotation axis X as the center. The first supporting ribs 15 are rotatably supported with respect to the first stator portion 141. In the following description, for the sake of convenience, the side of the first rotor portion 142 along the rotation axis X is referred to as the lower side, and the side of the first stator portion 141 is referred to as the upper side. However, the rotation axis X does not necessarily correspond to the direction of gravity.

The first stator portion 141 preferably includes a first base portion 1411 fixed to the above-mentioned first supporting ribs 15. The first base portion 1411 is preferably arranged in a substantially circular ring shape with the rotation axis X as the center when viewed in plan. The first base portion 1411 supports the respective members of the first stator portion 141. The first base portion 1411 is preferably made of a resin, but any other desirable material could be used. The first base portion 1411 is preferably formed by injection molding together with the plurality of first supporting ribs 15 and the first housing 11 which are also preferably made of the resin. The first base portion 1411, the first supporting ribs 15, and the first housing 11 are preferably formed integrally by die-casting with an aluminum alloy, but any other desirable method or material could be used.

As shown in FIG. 3, in a center opening of the first base portion 1411, a first bearing holding portion 1412 is integrally provided. The first bearing holding portion 1412 has a substantially cylindrical shape protruding from the first base portion 1411 to the lower side. On the inside of the first bearing holding portion 1412, ball bearings 1413 and 1414 are provided in the upper portion and the lower portion in the direction along the rotation axis X. The ball bearings 1413 and 1414 are included in the bearing mechanism.

The first stator portion 141 preferably further includes a first armature 1415 and a first circuit board 1416. The first armature 1415 is preferably attached to an outer circumference of the first bearing holding portion 1412. The first circuit board 1416 is attached on the upper side of the first armature 1415, and is arranged in a substantially circular ring shape. The first circuit board 1416 is electrically connected to the first armature 1415, to thereby control the first armature 1415. The first circuit board 1416 is preferably connected to an external power supply via a group of lead wires which is obtained by binding up a plurality of lead wires. The external power supply is disposed on the outside of the serial axial fan.

The first rotor portion 142 preferably includes a first yoke 1421 arranged in a substantially cylindrical shape with the rotation axis X as the center. On an inner wall of the first yoke 1421, a substantially cylindrical first field magnet 1422 which is opposed to the first armature 1415 is fixed. The first yoke 1421 is a metal with magnetization properties such as, for example, iron, steel, stainless steel, etc. The first yoke 1421 preferably has a lid portion in a lower end portion. The lid portion protrudes upward so that the above-mentioned first shaft 1423 inserted into the first bearing holding portion 1412 is attached. The first shaft 1423 is preferably rotatably supported by the first bearing holding portion 1412 via the ball bearings 1413 and 1414. In the first axial fan 1, the first shaft 1423 and the ball bearings 1413 and 1414 function as the bearing mechanism to rotatably support the first yoke 1421 with respect to the first bearing holding portion 1412 with the rotation axis X as the center.

The above-mentioned first impeller 13 preferably includes a substantially cylindrical first hub 132 arranged to cover an outside of the first yoke 1421 of the first motor portion 14. The above-mentioned plurality of first blades 131 extend radially from an outer circumference of the first hub 132. The first hub 132 has a lid on the lower side. The first hub 132 is preferably made of a resin, but any other desirable material could be used. The first hub 132 is preferably formed by injection molding together with the first blades 131 which are also made of the resin.

Next, the second axial fan 2 will be described. The configuration of the second axial fan 2 is substantially the same as that of the first axial fan 1, so that detailed description is omitted. Herein, the respective members of the second axial fan 2 are represented by replacing "first" with "second" for distinguishing them from the members of the first axial fan 1. For example, a member corresponding to the first circuit board 1416 is referred to as a second circuit board 2416 in the second axial fan 2.

As shown in FIG. 3, the top-to-bottom direction of the second axial fan 2 is preferably inverted from that of the first axial fan 1. For example, the second supporting ribs 25 are provided in the lower end portion of the second housing 21 so that they are opposed to the first supporting ribs 15. When viewed in plan, the position of the first supporting ribs 15 preferably corresponds to that of the second supporting ribs 25. The second rotor portion 242 and the second impeller 23 are attached on the upper side of the second stator portion 241 so as to rotate. The upper end portion of the first housing 11 is in contact with the lower end portion of the second housing 21. The first and second housings 11 and 21 are preferably connected in radially outer end portions by screws or other suitable fastening members or materials which are not shown in the figure.

The second circuit board 2416 of the second axial fan 2 is preferably arranged to be a substantially circular ring shape having a smaller radius than that of the first circuit board 1416. The first and second circuit boards 1416 and 2416 are opposed with the first and second supporting ribs 15 and 25 interposed therebetween. The first and second circuit boards

1416 and 2416 are preferably electrically connected by a conductive pin 3 extending in the direction along the rotation axis X. The pin 3 passes through the first and second base portions 1411 and 2411. The pin 3 can be connected to the first and second circuit boards 1416 and 2416 by soldering or any other desirable manner, for example. On the first and second circuit boards 1416 and 2416, electronic components such as Hall elements arranged to respectively detect the rotations of the first and second rotor portions 142 and 242 are mounted, for example. In addition, on the first circuit board 1416, a reverse-connect protection diode, a D/A converter, a microcomputer, a regulator circuit, and the like are preferably mounted. Because of the mounting of those electronic components, the area of the first circuit board 1416 is larger than that of the second circuit board 2416. These electronic components are electrically connected to the second circuit board 2416 via the pin 3. Accordingly, the first circuit board 1416 controls the rotation of the second impeller 23 in addition to the rotation of the first impeller 13. The reverse-connect protection diode protects the electronic components from being broken down due to the reverse flow of electric current through the circuit in the case of the reverse connection to the ground (GND). The D/A converter is a converter arranged to convert a digital control signal into an analog signal.

Next, the operation of the serial axial fan with the above-mentioned configuration will be described. In the first and second axial fans 1 and 2, a driving current is supplied to the first and second armatures 1415 and 2415 and the driving thereof is controlled by the first and second circuit boards 1416 and 2416. Torques with the rotation axis X as the center are generated between the first armature 1415 and the first field magnet 1422 and between the second armature 2415 and the second field magnet 2422. Accordingly, the blades 131 and 231 of the first and second impellers 13 and 23 respectively attached to the first and second rotor portions 142 and 242 are caused to rotate about the rotation axis X. Accordingly, the second axial fan 2 takes in the air from the upper side of FIG. 3 and sends the air to the first axial fan 1 on the lower side. Then, the first axial fan 1 sends the air sent from the second axial fan 2 to the lower side. In this way, the air is sent from the upper side to the lower side due to the action of the two axial fans 1 and 2, thereby cooling the electronic device such as, for example, the server.

In this preferred embodiment, as described above, a microcomputer 1417 is preferably mounted on the first circuit board 1416. Conventionally, in many cases, the first and second motor portions 14 and 24 having different rotational speeds are provided in the first and second axial fans 1 and 2, respectively. Therefore, when the first and second motor portions 14 and 24 rotate, the noise value generated from the first and second impellers 13 and 23 is generally larger than the noise value generated from a single axial fan. If the integral multiple elements of frequency in respective rotational speeds agree with each other, the vibrations resonate in harmony in the agreed frequency. When the vibrations resonate, there may arise a problem in that the noise is disadvantageously increased. In the case where a serial axial fan is not equipped with the rotational speed feedback control, there may arise another problem in that the rotational speeds of the first and second axial fans 1 and 2 are not stable. In such a case, there occurs a buzz in the noise generated from the serial axial fan. That is, the time with resonance and the time without resonance alternately occur. For this reason, it is preferred that the integral multiple elements of frequency of the noise values generated from the first and second axial fans 1 and 2, respectively, be controlled so they do not agree with each other.

For example, when the rotational speed of the first motor portion 14 increases, the control is performed to increase the rotational speed of the second motor portion 24. By such control, the occurrence of buzz can be prevented. That is, when the rotational speed of one of the motor portions is varied, the rotational speed of the other motor portion is obsequiously varied. Generally, in many cases, the number of blades of the first impeller 13 is different from that of the second impeller 23. Accordingly, the generated frequency component differs depending on the number of blades. Therefore, when the rotational speed feedback control is performed, it is preferred to previously store the mutual rotational speeds by which the resonance does not occur in the microcomputer 1417. It is also preferred that, when one of the rotational speeds is changed, the information for obsequiously changing the other rotational speed is previously stored in the microcomputer 1417. Accordingly, by the microcomputer 1417 mounted on one of the motors, depending on the variation of the rotational speed of one of the motors or the other motor, it is possible to change the rotational speed of the other motor or one of the motors. As a result, the increase in noise value can be prevented.

As described above, according to the present preferred embodiment, the first and the second circuit boards 1416 and 2416 are electrically connected. The first and second impellers 13 and 23 are controlled by electronic components mounted on at least one of the first and second circuit boards 1416 and 2416. Therefore, for example, the driving of the first impeller 13 can be controlled by the electronic components on the first circuit board 1416. Also, the control can be performed by the electronic components on the second circuit board 2416. Accordingly, the electronic components arranged to control the driving of the first and second impellers 13 and 23 can be arbitrarily mounted on anyone of the circuit boards. Therefore, the circuit board can be flexibly designed in view of the whole of the serial axial fan.

Especially in this preferred embodiment, a portion of the electronic components such as the reverse-connect protection diode are mounted only on the first circuit board 1416, to control the driving of both of the impellers 13 and 23. In other words, electronic components which would conventionally be mounted on each of the circuit boards 1416 and 2416 of the axial fans 1 and 2 are now mounted on only one of the circuit boards, and shared. Accordingly, for example, the number and the kind of electronic components mounted on the respective circuit boards 1416 and 2416 can be changed. As a result, a special electronic control component can be mounted on the other circuit board, if required. Alternatively, electronic components which can be used by the circuit boards 1416 and 2416 in common can be disposed on one of the circuit boards. As a result, the design can be flexibly performed. Thus, the cost can be reduced, and the area of the second circuit board 2416 can be reduced. If the area of the second circuit board 2416 can be reduced, the volume of the air channel of the second axial fan 2 can be increased.

The above-described configuration is especially advantageous, for example, for the case where the rotations of the first and second impellers 13 and 23 are controlled so that the air flowing from the second housing 21 is discharged via the first housing 11. In other words, if some of the electronic components arranged to drive the second impeller 23 are mounted on the first circuit board 1416, the mounting area of the second circuit board 2416 can be reduced. As a result, the volume of the air channel of the second housing 21 on the air-intake side can be increased, thereby attaining a sufficiently high volume of air. In some cases, high load may disadvantageously be applied to the first impeller 13 due to the high volume of air flowing into the first housing 11. For this reason, an electronic component arranged to control the driving under high load is required on the first circuit board 1416. In such a case, for example, the mounting area of the first circuit board 1416 is increased by the amount in accordance with the reduction of the mounting area of the second circuit board 2416. As a result, it is possible to realize the above-mentioned arrangement of electronic components under high load.

At this time, a high volume of air is caused to flow into the first housing 1, so that high load is sometimes applied to the first impeller 13. For this reason, on the first circuit board 1416, an electronic component arranged to control the driving under high load (a regulator circuit, for example) is required. However, in this preferred embodiment, the area of the second circuit board 2416 is decreased, and the area of the first circuit board 1416 is increased. Accordingly, the electronic component required in the case of high load can be mounted on the first circuit board 1416.

In this preferred embodiment, the first circuit board 1416 in the first motor portion 14 is placed on the side of the second housing 21. In addition, the second circuit board 2416 in the second motor portion 24 is placed on the side of the first housing 11. Accordingly, the distance between the circuit boards is decreased, and the conducting device such as a cable arranged to electrically connect the circuit boards can be shortened. As a result, the provision of the conducting device can be easily realized.

In addition, the first and second circuit boards 1416 and 2416 are electrically connected by the pin 3, so that the following advantages exist. That is, when a power is supplied from an external power source to the serial axial fan, only one of the circuit boards can be connected to the external power source by a lead wire or other suitable connection. To the other circuit board, the power can be supplied via the pin 3. Accordingly, the lead wire is not required to be connected to both of the first and second circuit boards by soldering or other method. As a result, the production cost and the assembling time can be reduced. The material costs of the lead wire and the soldering can also be reduced.

Figure 4:
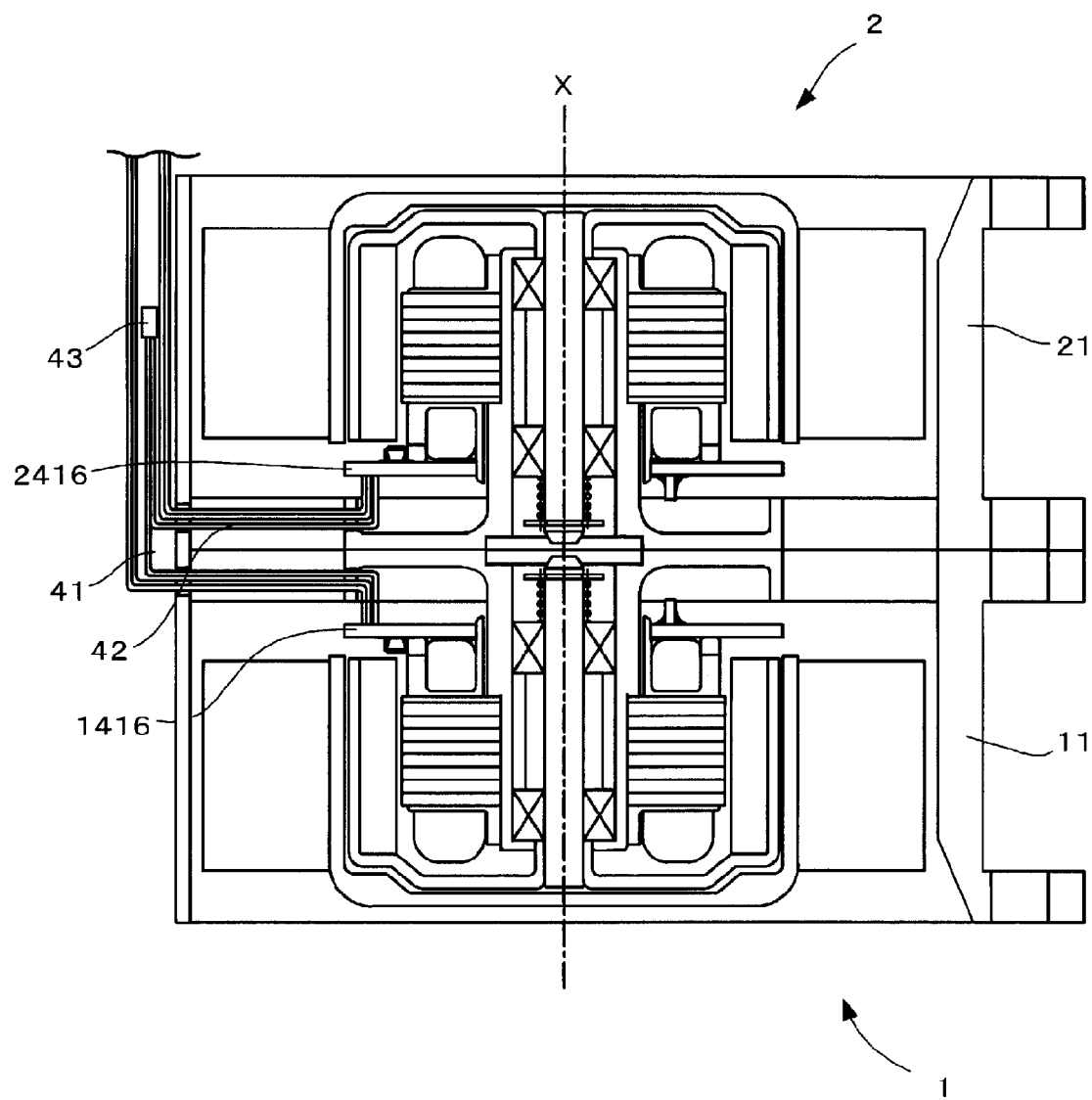
FIG. 4 is a longitudinal sectional view of another example of the serial axial fan of FIG. 1.
Figure 5:
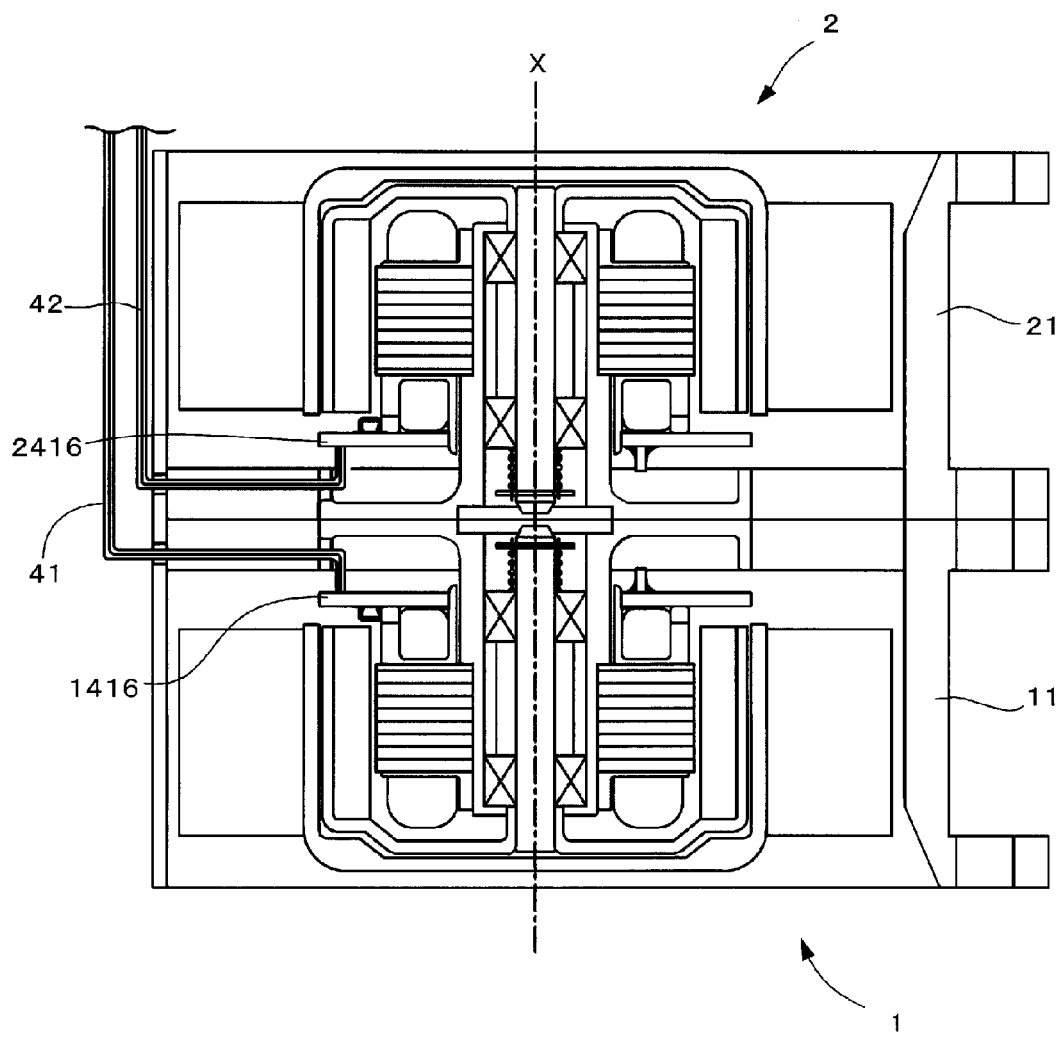
FIG. 5 is a longitudinal sectional view of still another example of the serial axial fan of FIG. 1.

In this preferred embodiment, the first and second circuit 1416 and 2416 are electrically connected by the conductive pin 3. However, the connecting method between the circuit boards 1416 and 2416 is not limited to this, and various other connection methods can be performed. For example, instead of the pin, a lead wire, a detachable connecter, or the like can be used for the connection. In the case where lead wires are used, as shown in FIG. 4, lead wires 41 and 42 are connected to the first and second circuit boards, respectively. The lead wires 41 and 42 can be extended to the external of the respective housings 11 and 21, to be connected by a connecter 43 attached to an outer circumference of the housings. In the figure, the lead wires connected to the external power source and the like from the first and second circuit boards 1416 and 2416 are also shown. Alternatively, as shown in FIG. 5, the lead wires 41 and 42 are extended to the external of the housings, to be connected on other devices or circuits.

In addition, in this preferred embodiment, the microcomputer 1417 is mounted on the first circuit board 1416. The microcomputer 1417 can control the driving of the respective first and second impellers 13 and 23. By performing the feedback control of the respective driving of the first and second impellers 13 and 23, the respective driving of the first and second impellers 13 and 23 can be controlled synchronously. In other words, even in the case where the microcomputer 1417 is not provided in the second axial fan 2, the rotational speeds of the respective axial fans can be synchronized in accordance with the instruction from the single microcomputer 1417 provided in the first axial fan 1. Accordingly, the first and second impellers 13 and 23 can be driven at the optimal rotational speeds which are respectively set. In addition, the number of the microcomputer 1417 to be mounted is one, so that the number of electronic components in the whole of the serial axial fan can be reduced. With this configuration, in the case where the microcomputer 1417 is mounted only on the side of the first axial fan 1, the information on the rotational speed of the second impeller 23 is fed back to the microcomputer 1417. The microcomputer 1417 can vary the rotational speed of the first impeller 13 in accordance with the rotational speed of the second impeller 23. The rotational speeds of the first and second impellers 13 and 23 are set to not cause any sympathetic vibration or resonance due to the frequencies generated by the rotation. That is, when the rotational speed of one of the impellers is changed, the rotational speed of the other impeller is changed in accordance with the change, so that the increase in noise value can be prevented.

In this preferred embodiment, only one microcomputer 1417 is preferably mounted, so that the land pattern can be simplified as compared with a case where microcomputers are provided in each the respective axial fans. Thus, the circuit pattern can be efficiently configured. From the viewpoint of the number of components, it is sufficient to provide at least one microcomputer. However, from the viewpoint of preventing the increase in noise value, the number of microcomputers is not limited to one.

Second Preferred Embodiment

Figure 6:
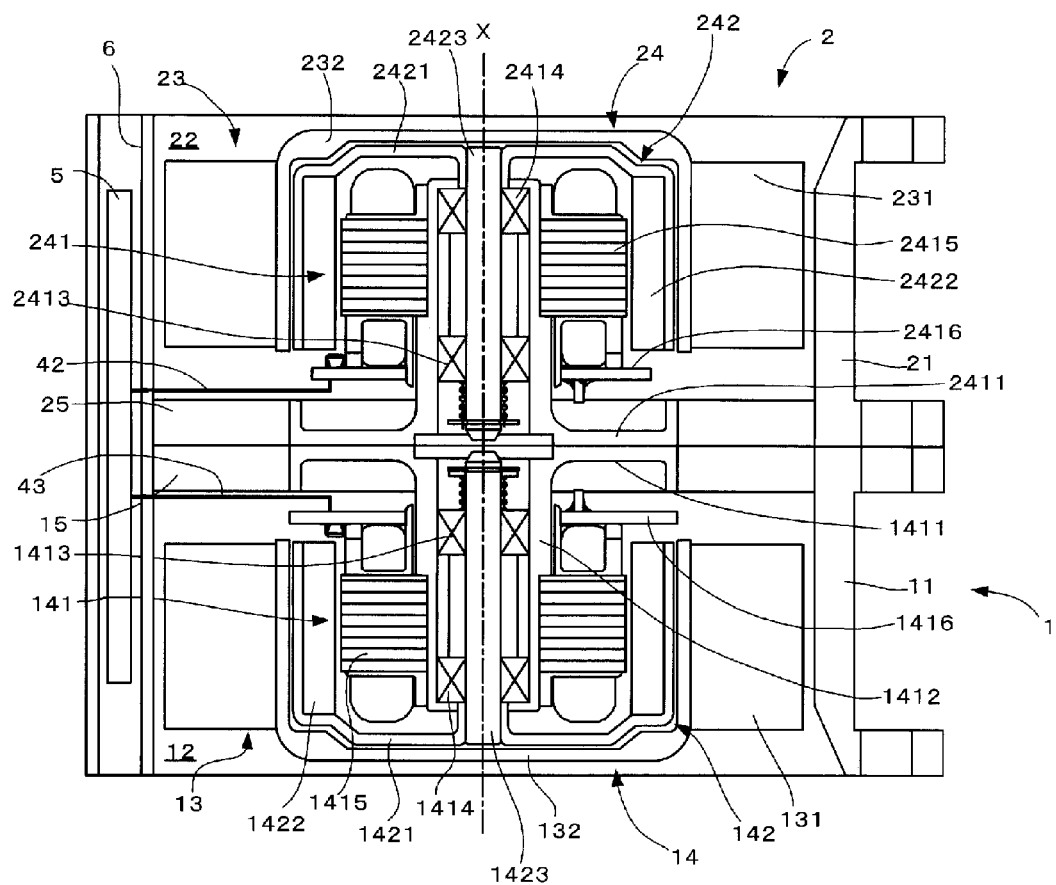
FIG. 6 is a longitudinal sectional view of a serial axial fan according to a second preferred embodiment of the present invention.

Next, a serial axial fan according to a second preferred embodiment of the present invention will be described with reference to FIG. 6. FIG. 6 is a sectional view of the serial axial fan of the second preferred embodiment.

The second preferred embodiment is different from the first preferred embodiment in that a third circuit board 5 is disposed on the outside of an air channel region of the housing. Additionally, the second preferred embodiment is different in that the first and second circuit boards 1416 and 2416 are not connected by a pin. The other configurations are the same, so that the same reference numerals are attached to the same components, and the descriptions thereof are omitted.

As shown in FIG. 6, in the serial axial fan of the second preferred embodiment, an accommodating space 6 which extends in an axial direction is disposed outside of air channel regions 12 and 22 in the first and second housings 11 and 21. The accommodating space 6 is preferably arranged to extend over the housings 11 and 21, and the third circuit board 5 is disposed in the accommodating space 6. The third circuit board 5 and the first and second circuit boards 1416 and 2416 are connected by lead wires 41 and 42, respectively. The lead wires 41 and 42 are preferably disposed along the first and second supporting ribs 15 and 25. At this time, to the first and second supporting ribs 15 and 25, the lead wires 41 and 42 can preferably be fixed or locked by a hook or other suitable member.

The electronic components mounted on the respective circuit boards 1416 and 2416 are not specifically limited. However, at least on the first and second circuit boards 1416 and 2416, it is necessary to mount an electronic component such as, for example, a Hall element arranged to detecting the rotation of the rotor portion. However, the other electronic components such as a reverse-connect protection diode, a microcomputer, and the like may be mounted on any one of the circuit boards 1416, 2416, and 5.

As described above, in this preferred embodiment, the third circuit board 5 is disposed on the outside of the air channel regions of the first and second housing 11 and 21. Accordingly, on the first and second circuit boards 1416 and 2416, only a minimum number of electronic components arranged to drive the first and second impellers 13 and 23 can be mounted. The other electronic components are to be mounted on the third circuit board 5. With such a configuration, the mounting areas of the first and second circuit boards 1416 and 2416 can be reduced. In addition, the volumes of the air channel regions 12 and 22 of the first and second housings 11 and 21 can be increased. In this preferred embodiment, the third circuit board 5 is connected to the first and second circuit boards 1416 and 2416 by the lead wires 41 and 42, respectively. However, for example, if the first and second circuit boards 1416 and 2416 are electrically connected by a lead wire or the like, the third circuit board 5 may be connected to one of the first and second circuit boards 1416 and 2416. As described above, in this preferred embodiment, with the provision of the third circuit board 5, the circuit can be more flexibly designed. If necessary, the electronic components can be disposed to decrease the area of at least one of the first and second circuit boards 1416 and 2416.

It is preferred that the third circuit board 5 be disposed on the outside of the air channel regions 12 and 22 of the housings 11 and 21. Accordingly, the size of each housing is slightly increased, but the air channel region is not made to be narrow, and the volume of air can be maintained.

While the preferred embodiments of the present invention have been described above, it is to be understood that variations and modifications will be apparent to those skilled in the art without departing the scope and spirit of the present invention.

For example, the electronic components mounted on the first to third circuit boards 1416, 2416, and 5 in the above-described preferred embodiments are exemplarily shown. On the respective circuit boards 1416, 2416, and 5, various electronic components can be interchangeably disposed in accordance with the required performances. In the first preferred embodiment, the area of the second circuit board 2416 is preferably smaller than that of the first circuit board 1416, but the configuration is not limited to this. That is, the area of a circuit board is appropriately determined in accordance with the require performances. If necessary, the area of the first circuit board 1416 can be decreased. In addition, the first and second circuit boards 1416 and 2416 are not necessarily disposed oppositely. Depending on the orientations of the first and second axial fans 1 and 2, the first and second circuit boards 1416 and 2416 are disposed in mutually separated manner. In such cases, it is sufficient that the first and second circuit boards 1416 and 2416 should be electrically connected. In the above-described preferred embodiments, the first and second supporting ribs 15 and 25 are disposed oppositely, to not interfere with the flow of the air in the air channel. However, the configuration is not necessarily required. If necessary, the first and second supporting ribs 15 and 25 may be disposed in a shifted manner when viewed in plan. Alternatively, the first and second supporting ribs 15 and 25 are made to have a blade shape in section, so that they may also function as a stationary blade.

In the second preferred embodiment, the third circuit board 5 is disposed in the accommodating space 6 over the housings 11 and 21. However, instead of the accommodating space, it is sufficient to provide a recessed portion in which the circuit board can be disposed, or other attaching mechanisms. Such attaching mechanisms may be provided in any of the housings. The number of the third circuit board 5 is not limited to one, but a plurality of third circuit boards may be provided.

In the above-described preferred embodiments, the first housing 11 and the second housing 21 are separately defined and fixed. Alternatively, these housings may be integrally provided.

The present invention can be applied to a serial axial fan having three or more impellers, in addition to the serial axial fan having two impellers, for example. In such a case, any two circuit boards among circuit boards arranged to control the driving of the three or more impellers can have the above-described configuration. For example, adjacent circuit boards may be electrically connected, or two circuit boards which are separately located may be electrically connected. Alternatively, the above-described configuration may be provided for all of the three or more circuit boards.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A serial axial fan comprising:
    a first impeller including a plurality of first blades radially extending from a first hub with a rotation axis as a center;
    a first motor portion arranged to drive and rotate the first impeller to generate an air flow in an axial direction of the rotation axis;
    a first housing arranged to accommodate the first impeller and the first motor portion, the first housing being defined by a cylinder having openings in both end portions in the axial direction;
    a second impeller including a plurality of second blades radially extending from a second hub with the rotation axis as a center;
    a second motor portion arranged to drive and rotate the second impeller to generate an air flow in the axial direction of the rotation axis; and
    a second housing, aligned with the first housing in the axial direction to define a fan assembly, the second housing arranged to accommodate the second impeller and the second motor portion, the second housing being defined by a cylinder having openings in both end portions in the axial direction; wherein
    the first motor portion includes a first circuit board on which at least one electronic component arranged to drive the first impeller is mounted;
    the second motor portion includes a second circuit board on which at least one electronic component arranged to drive the second impeller is mounted;
    the first circuit board and the second circuit board are directly electrically connected to each other such that at least one electrical signal is transmitted between the first circuit board and the second circuit board;
    at least one electronic component mounted on one of the first and second circuit boards is arranged to control both the driving of the first impeller and the driving of the second impeller; and
    the serial axial fan further includes a conductive member arranged to electrically connect the first circuit board and the second circuit board, the conductive member being completely radially within a largest outermost circumferential surface of the first hub or the second hub and the fan assembly.

2. The serial axial fan according to claim 1, wherein an area of the first circuit board is different from an area of the second circuit board.

3. The serial axial fan according to claim 2, wherein rotation of the first and second impellers is controlled so that the air flowing from the second housing is discharged via the first housing, and the area of the second circuit board is smaller than the area of the first circuit board.

4. The serial axial fan according to claim 1, wherein at least one microcomputer mounted on the one of the first and second circuit boards is arranged to control the driving of each of the first and second impellers.

5. The serial axial fan according to claim 1, wherein the first circuit board is disposed in the first motor portion adjacent to a side of the second housing, and the second circuit board is disposed in the second motor portion adjacent to a side of the first housing.

6. The serial axial fan according to claim 1, further comprising:
   a plurality of first supporting ribs arranged to support the first motor portion, the first supporting ribs extending radially between the first impeller and the first housing; and
   a plurality of second supporting ribs arranged to support the second motor portion, the second supporting ribs extending radially between the second impeller and the second housing; wherein
   the first and second supporting ribs are disposed mutually oppositely in the axial direction between the first and second impellers.

7. The serial axial fan according to claim 1, wherein the conductive member is arranged axially between the first circuit board and the second circuit board to directly electrically connect the first circuit board and the second circuit board to each other.

8. The serial axial fan according to claim 7, wherein the conductive member is defined by a conductive pin that is arranged to pass through both of a first hole defined in the first housing and a second hole defined in the second housing.

* * * * *